United States Patent
Glaister

(10) Patent No.: US 11,728,767 B2
(45) Date of Patent: Aug. 15, 2023

(54) TECHNIQUES FOR QUANTIFYING BEHIND-THE-METER SOLAR POWER GENERATION

(71) Applicant: ITRON, INC., Liberty Lake, WA (US)

(72) Inventor: Brian Glaister, Seattle, WA (US)

(73) Assignee: ITRON, INC., Liberty Lake, WA (US)

(*) Notice: Subject to any disclaimer, the term of this patent is extended or adjusted under 35 U.S.C. 154(b) by 275 days.

(21) Appl. No.: 16/696,873

(22) Filed: Nov. 26, 2019

(65) Prior Publication Data

US 2021/0159851 A1  May 27, 2021

(51) Int. Cl.
| | |
|---|---|
| *H02S 50/00* | (2014.01) |
| *G01W 1/00* | (2006.01) |
| *G06F 17/18* | (2006.01) |
| *G06Q 50/06* | (2012.01) |
| *G06N 3/02* | (2006.01) |
| *G01W 1/10* | (2006.01) |
| *G06Q 10/06* | (2023.01) |

(Continued)

(52) U.S. Cl.
CPC .............. *H02S 50/00* (2013.01); *G01W 1/00* (2013.01); *G06F 17/18* (2013.01); *G06Q 50/06* (2013.01);
(Continued)

(58) Field of Classification Search
CPC .......... H02S 50/00; G01W 1/00; G01W 1/12; G01W 1/10; G01W 2201/00; G01W 2203/00; G01W 2001/006; G06F 17/18; G06Q 50/06; G06Q 10/06; Y02E 10/50; G06N 3/046; G06N 3/02; G06N 5/025;
(Continued)

(56) References Cited

U.S. PATENT DOCUMENTS

| | | |
|---|---|---|
| 2011/0276269 A1 | 11/2011 | Hummel |
| 2014/0278107 A1* | 9/2014 | Kerrigan .............. G01W 1/18 702/3 |

(Continued)

FOREIGN PATENT DOCUMENTS

| | | | |
|---|---|---|---|
| JP | 2004242433 A | * | 8/2004 |
| JP | 2011215672 A | * | 10/2011 |

(Continued)

OTHER PUBLICATIONS

Padarian, "Weekend project: Detecting solar panels from satellite imagery", Towards Data Science, Oct. 18, 2018) (Year: 2018).*

(Continued)

*Primary Examiner* — Daniel R Miller
*Assistant Examiner* — Christian T Bryant
(74) *Attorney, Agent, or Firm* — Artegis Law Group, LLP

(57) ABSTRACT

A forecast engine is configured to analyze aerial and/or satellite images depicting a geographic area to identify the existence of solar panels within the geographic area at different times. Based on the installation time of each solar panel, the forecast engine estimates the solar power generation capacity of the solar panel. The forecast engine also analyzes meteorological data, including weather forecasts, to estimate a level of insolation at each solar panel within the geographic area across a range of times. The forecast engine can then determine the total amount of solar power generation within the given geographic area at a particular time using the solar power generation capacity of each solar panel and the level of insolation at each solar panel at the particular time.

18 Claims, 8 Drawing Sheets

(51) Int. Cl.
*G01W 1/12* (2006.01)
*G06T 17/00* (2006.01)
*G05B 13/02* (2006.01)
*G06T 19/00* (2011.01)

(52) U.S. Cl.
CPC ............ *G01W 1/10* (2013.01); *G01W 1/12* (2013.01); *G01W 2001/006* (2013.01); *G01W 2201/00* (2013.01); *G01W 2203/00* (2013.01); *G05B 13/02* (2013.01); *G06N 3/02* (2013.01); *G06Q 10/06* (2013.01); *G06T 17/00* (2013.01); *G06T 19/00* (2013.01); *Y02E 10/50* (2013.01)

(58) Field of Classification Search
CPC ...... G06N 7/005; G05B 13/02; G06K 9/6256; G06K 9/6269; G06T 17/00; G06T 19/00
See application file for complete search history.

(56) References Cited

U.S. PATENT DOCUMENTS

| | | | |
|---|---|---|---|
| 2015/0269664 A1* | 9/2015 | Davidson | G06Q 40/00 705/35 |
| 2016/0204606 A1* | 7/2016 | Matan | H02J 13/00028 700/291 |
| 2019/0158011 A1* | 5/2019 | West | H01L 31/042 |
| 2019/0319580 A1* | 10/2019 | Dildine | H02S 30/00 |

FOREIGN PATENT DOCUMENTS

| | | | | |
|---|---|---|---|---|
| JP | 2013152156 A | * | 8/2013 | |
| WO | WO-2014109020 A1 | * | 7/2014 | ............ G01W 1/10 |

OTHER PUBLICATIONS

"Solar Irradiance", Wikipedia, Sep. 30, 2019, https://web.archive.org/web/20190930003815/https://en.wikipedia.org/wiki/Solar_irradiance (Year: 2019).*
Kuster et al., "Electrical load forecasting models: A critical systematic review", http://dx.doi.org/10.1016/j.scs.2017.08.009, 14 pages.
Sobri et al., "Solar photovoltaic generation forecasting methods: A review", https://doi.org/10.1016/j.enconman.2017.11.019, 39 pages.
Dr. Frank A. Monforte, "A Practitioner's Guide to Short-Term Load Forecast Modeling", www/itron.com/forecasting, Jul. 21, 2018, 206 pages.
International Search Report for application No. PCT/US2020/060858 dated Feb. 9, 2021.

* cited by examiner

TECHNIQUES FOR QUANTIFYING BEHIND-THE-METER SOLAR POWER GENERATION

BACKGROUND

Field of the Various Embodiments

The various embodiments relate generally to electricity distribution and solar power generation, and, more specifically, to techniques for quantifying behind-the-meter solar power generation.

DESCRIPTION OF THE RELATED ART

Electricity providers typically generate electricity via one or more power plants and then distribute that electricity to downstream consumers via an electricity distribution infrastructure. For example, an electricity provider could generate electricity via a nuclear power plant and then distribute that electricity to downstream residences via a power grid. Electricity providers usually monitor the distribution of electricity in real time in order to scale electricity generation in response to varying levels of demand for electricity. In the above example, the electricity provider could remotely read electricity meters associated with the downstream residences to determine that an increasing amount of electricity needs to be distributed to those residences. In response, the electricity provider could increase the electricity generation of the nuclear power plant to support the increasing need for electricity.

Scaling electricity generation, as described above, helps avoid situations where too little or too much electricity is generated. When too little electricity is generated, some downstream consumers can experience blackouts, and the utility provider then has to purchase electricity on the electricity spot market to provide these consumers with sufficient electricity. When too much electricity is generated, the excess electricity cannot be stored easily and typically goes to waste. However, scaling electricity generation usually takes time and does not happened instantaneously due to various complexities associated with power plant operation. Accordingly, electricity providers try to make predictions about the amount of electricity that needs to be distributed to consumers over future intervals of time. Based on these predictions, electricity providers attempt to preemptively scale electricity generation in advance of those future intervals of time, thereby avoiding situations where too little or too much electricity is generated.

To predict the amount of electricity that needs to be distributed to consumers at some future point in time, electricity providers analyze historical electricity distribution data to determine trends in electricity demand. For example, an electricity provider could analyze historical electricity distribution data to identify one or more specific times of day when electricity distribution has historically exceeded normal levels. The electricity provider could then predict that electricity distribution should also exceed normal levels during those specific times of day on a going-forward basis. This approach can yield accurate predictions of future electricity demand so long as the historical trends in electricity distribution properly correlate to future electricity demand levels.

One problem that has arisen in predicting future electricity demand levels is the increased adoption of solar power systems, especially in residential areas. With these types of systems, consumers within a given geographic area can use solar-based electricity instead of electricity produced from an electricity provider. With the ability of customers to draw electricity from solar power systems, an electricity provider cannot accurately predict how much electricity needs to be generated to meet customer demand because the electricity provider does not know how much electricity customers may use from the solar power systems. Electricity generation via solar power systems cannot be measured by conventional electricity meters and may therefore be referred to as "behind-the-meter" power generation, especially in residential contexts. Behind-the-meter electricity generation can make historical trends in electricity distribution an inaccurate predictor of future electricity demand levels from the perspective of an electricity provider. Accordingly, electricity providers typically need to predict behind-the-meter electricity generation within the geographic area during a future interval of time in order to accurately scale electricity generation and distribution in advance of that future interval of time.

One problem, though, that electricity providers experience in predicting behind-the-meter electricity generation within a given area is that the amount of electricity generated can vary over time based on weather conditions and other irregular environmental factors. For example, a typical solar power system generates more electricity on sunny days than on cloudy days. These types of environmental irregularities prevent electricity providers from accurately predicting behind-the-meter electricity generation, therefore reducing the accuracy with which electricity providers can scale electricity generation to meet expected distribution levels and potentially leading to situations where too little or too much electricity is generated.

As the foregoing illustrates, what is needed in the art is a more effective technique for quantifying solar power generation within a geographic area.

SUMMARY

Various embodiments include a computer-implemented method for determining a set of solar panels within a geographic area based on at least one image that depicts the geographic area at a first point in time, computing a plurality of insolation levels associated with the set of solar panels based on geographic data associated with the geographic area, wherein each insolation level indicates an amount of solar irradiance present at a different solar panel included in the set of solar panels at a second point in time, generating solar power generation data for the geographic area based on the plurality of insolation levels, wherein the solar power generation data indicates an amount of electricity generated within the geographic area via the set of solar panels at the second point in time.

At least one technical advantage of the disclosed techniques relative to the prior art is that the disclosed techniques enable more accurate predictions of solar power generation to be made for geographic areas where the distribution of solar power systems us unknown and irregular environmental factors cause the amount of solar power that can be generated over given periods of time to vary unpredictably. Accordingly, electricity providers can more effectively predict the amount of electricity that needs to be generated and distributed to consumers who use their own solar power systems.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
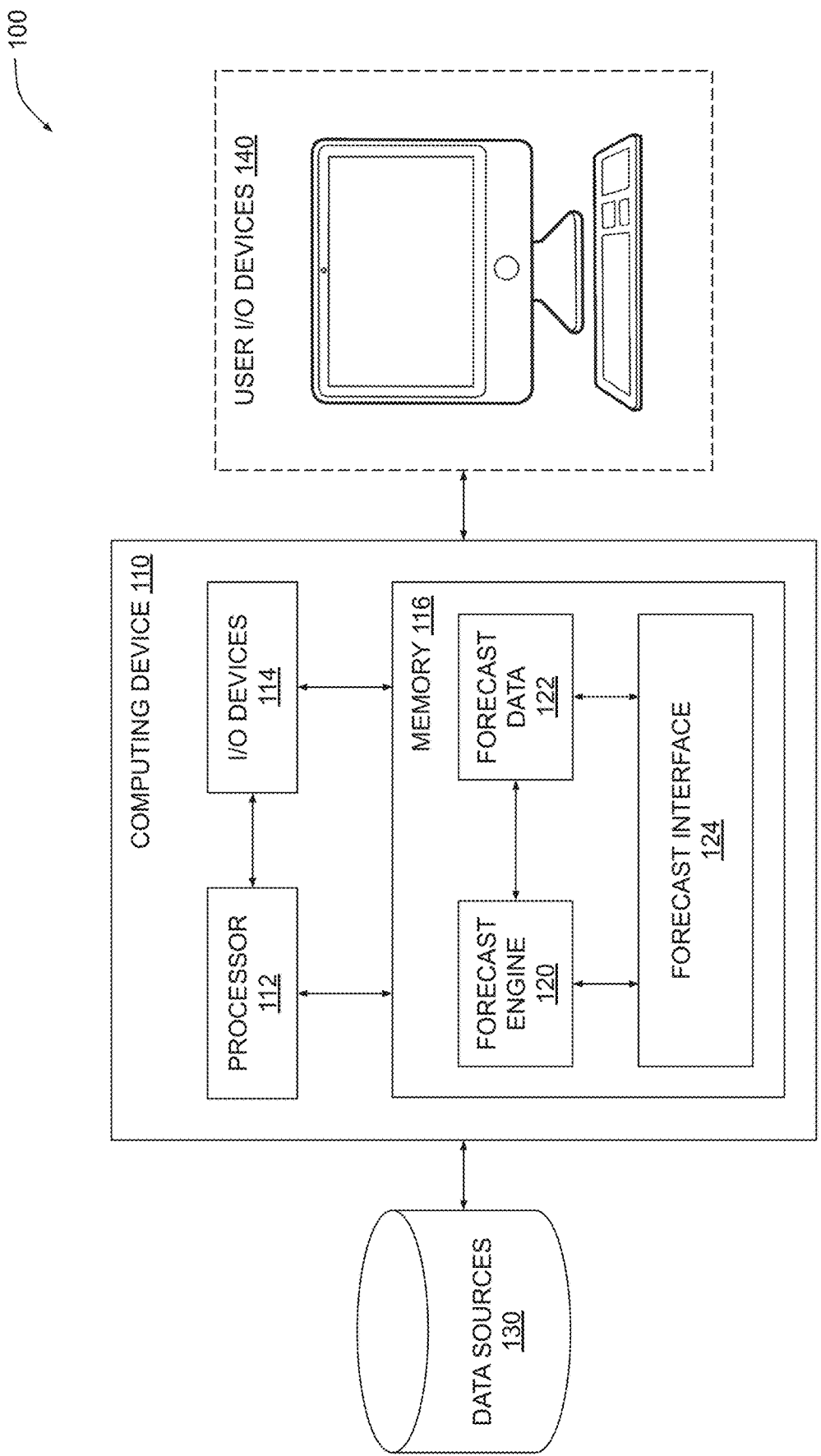
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, electricity providers lack the ability to accurately predict the amount of electricity that can be generated by solar power systems within a given geographic area (especially in residential areas) and therefore cannot accurately predict how much electricity needs to be generated for the given geographic area at any given time. Consequently, electricity providers can have difficulty scaling electricity generation relative to the amount of electricity that needs to be distributed to the given geographic area, potentially leading to situations where too little or too much electricity is generated. When too little electricity is generated, consumers can experience blackouts, and when too much electricity is generated, the excess electricity typically goes to waste.

To address these issues, various embodiments includes a forecast engine that is configured to analyze aerial and/or satellite images depicting a geographic area to identify the existence of solar panels within the geographic area at different times. Based on the installation time of each solar panel, the forecast engine estimates the solar power generation capacity of the solar panel. The forecast engine also analyzes meteorological data, including weather forecasts, to estimate a level of insolation at each solar panel within the geographic area across a range of times. The forecast engine can then determine the total amount of solar power generation within the given geographic area at a particular time using the solar power generation capacity of each solar panel and the level of insolation at each solar panel at the particular time.

The forecast engine performs the above operations to generate solar power generation forecasts for the geographic area across a range of time frames and for specific locations and/or regions within the geographic area. The forecast engine can also analyze infrastructure data associated with the geographic area to identify various impediments to electricity distribution that may interfere with the efficient distribution of electricity. This information can be useful for energy traders when predicting electricity prices. For a given impediment to electricity distribution, the forecast engine determines one or more infrastructure modifications that may mitigate the given impediment and potentially facilitate more efficient distribution of electricity. The forecast engine also generates a forecast interface that allows a user to interactively select specific locations and/or regions of the geographic area and obtain solar power generation forecasts for those specific locations and/or regions.

At least one technical advantage of the disclosed techniques relative to the prior art is that the disclosed techniques enable more accurate predictions of solar power generation to be made for geographic areas where the distribution of solar power systems is unknown and irregular environmental factors cause the amount of solar power that can be generated over given periods of time to vary unpredictably. Accordingly, electricity providers can more effectively predict the amount of electricity that needs to be generated and distributed to consumers who use their own solar power systems. Thus, with the disclosed techniques, electricity providers can more effectively scale electricity generation, thereby avoiding situations where they generate too little or too much electricity. These technical advantages represent one or more technological advancements over prior art approaches.

System Overview

FIG. 1 illustrates a system configured to implement one or more aspects of the various embodiments. As shown, a system 100 includes a computing device 110 coupled to data sources 130 and user input/output (I/O) devices 140. Computing device 110 may be any technically feasible type of computer system, including a desktop computer, a laptop computer, a mobile device, a virtualized instance of a computing device, a distributed and/or cloud-based computer system, and so forth. Data sources 130 may include any technically feasible source of data, including one or more databases, one or more file transfer protocol (FTP) servers, and so forth. User I/O devices 140 may include any technically feasible device configured to receive input from a user and/or provide output to a user, including a keyboard, a mouse, a display device, a touchscreen, and so forth.

Computing device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs) or one or more graphics processing units (CPUs). I/O devices 114 include any technically feasible set of devices configured to perform input and/or output operations on behalf of processor 112 and/or memory 116, including, for example, a universal serial bus (USB) port, a serial port, and so forth. Memory 116 includes any technically feasible storage media configured to store data and software applications, such as, for example, a hard disk, a random-access memory (RAM) module, and a read-only memory (ROM). Memory 116 includes a forecast engine 120, forecast data 122, and a forecast interface 124.

Forecast engine 120 is a software application that, when executed by processor 112, is configured to extract various types of data associated with a geographic area from data sources 130. Forecast engine 120 processes the extracted data in order to generate forecast data 122. Forecast data 122 includes predictions of solar power generation levels corresponding to solar power systems that reside within the geographic area. Forecast data 122 also includes infrastructure modifications for the geographic area that can potentially mitigate various impediments to electricity distribution that potentially occur in conjunction with predicted levels of solar power generation. Based on forecast data 122, forecast engine 120 generates forecast interface 124 to visually represent the geographic area. Forecast engine 120 can receive user input via forecast interface 124 and then update forecast interface 124 to display portions of forecast data 122 based on that user input. Various data and processing operations associated with forecast engine 120 are described in greater detail below in conjunction with FIG. 2.

Software Overview

Figure 2:
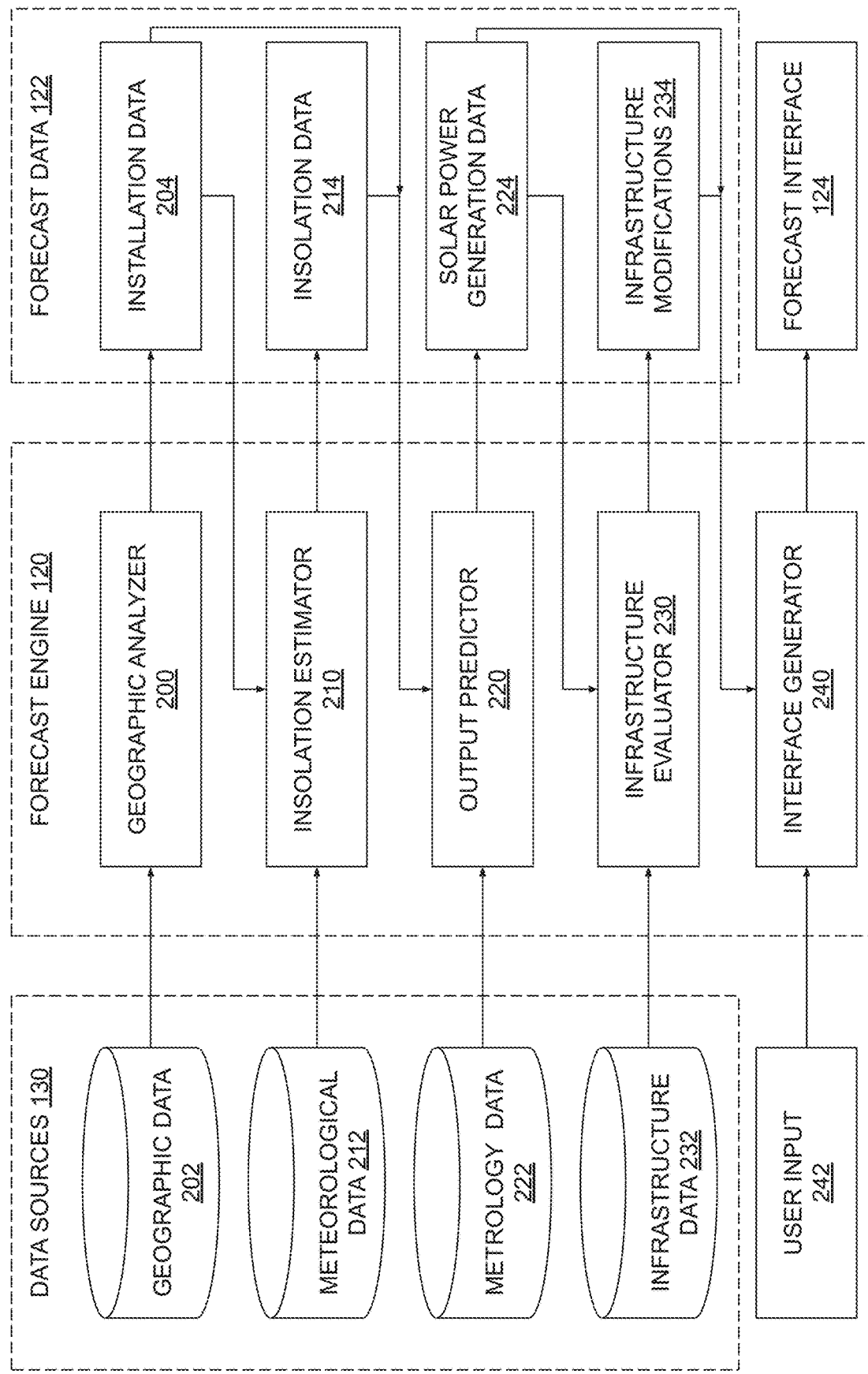
FIG. 2 sets forth more detailed illustrations of the data sources, forecast engine, and forecast data of FIG. 1, according to various embodiments.

FIG. 2 sets forth more detailed illustrations of the data sources, forecast engine, and forecast data of FIG. 1, according to various embodiments. As shown, forecast engine 120 includes a geographic analyzer 200, an insolation estimator 210, an output predictor 220, an infrastructure evaluator 230, and an interface generator 240. These various software modules perform some or all operations associated with forecast engine 120 based on data derived from data sources 130. Data sources 130 includes geographic data 202, meteorological data 212, metrology data 222, and infrastructure data 232. Based on these various data sources, forecast engine 120 generates forecast data 122, which includes installation data 204, insolation data 214, solar power generation data 224, and infrastructure modifications 234, as is shown.

Geographic analyzer 200 is configured to analyze geographic data 202 to generate installation data 204. Geographic data 202 includes multidimensional data that describes the geographic area mentioned above in conjunction with FIG. 1. Geographic data 202 may include aerial images, satellite images, light detection and ranging data, drone reconnaissance data, and any other technically feasible type of data associated with the geographic area. As referred to herein, the term "images" refers to any technically feasible form of graphical data having any number of dimensions. Geographic data 202 may further include similar types of data collected at different times. For example, geographic data 202 could include satellite images of the geographic area recorded across a range of times.

Installation data 204 describes solar panels that reside in the geographic area. When generating installation data 204, geographic analyzer 200 processes geographic data 202 to identify the presence of solar panels within the geographic area and determines various attributes of those solar panels, including the location, dimensions, orientation, shading level, and so forth. Geographic analyzer 200 may implement computer vision, machine learning, artificial intelligence, and/or any other applicable techniques for identifying features, including groups of pixels and corresponding locations, within images or portions thereof to identify the presence of solar panels within the geographic area. In so doing, geographic analyzer 200 may rely on any technically feasible form of training data, including images that depict sets of solar panels. Geographic analyzer 200 also compares different portions of geographic data 202 collected at different times to estimate an installation time associated with each solar panel. Geographic analyzer 200 may also analyze an amount of soiling and/or shading on each solar panel and use this information when estimating the solar power generation capacity of the solar panel. Geographic analyzer 200 collects these different types of information into installation data 204.

Insolation estimator 210 is configured to process meteorological data 212 in conjunction with installation data 204 to generate insolation data 214. Meteorological data 212 includes data related to atmospheric and/or weather phenomena within the geographic area over different time frames. Meteorological data 204 may include historical data and/or predictive data, including historical weather measurements and/or real-time weather forecasts. Meteorological data 204 generally indicates how different meteorological phenomena can modify insolation levels within the geographic area. For example, meteorological data 204 could include a weather forecast predicting cloud cover over the geographic area at a given point in time, or an air quality report that suggests the presence of atmospheric smoke over the geographic area at the given point in time.

Insolation data 214 indicates the level of insolation at any given location within the geographic area at any given point in time. When generating insolation data 214, insolation estimator 210 processes meteorological data 212 based on installation data 204 to determine or predict, for any given point in time, a level of insolation at each solar panel described in installation data 204. In doing so, insolation estimator 210 analyzes seasonal variations in solar position to determine a primary level of insolation within the geographic area at the given point in time. For example, insolation estimator 210 could determine the angle of incidence of solar rays at a surface of the geographic area at the given point in time based on the position of the sun relative to the geographic area at the given point in time. Then, based on the specific attributes of each solar panel set forth in installation data 204, insolation estimator 210 modifies that primary level of insolation to generate a secondary insolation level for each solar panel at the given point in time. For example, insolation estimator 210 could determine the angle of incidence of solar rays at each solar panel based on the location and/or orientation of those solar panels at the given point in time. Using meteorological data 204, insolation estimator 210 modifies the secondary insolation level to account for various meteorological phenomena, thereby creating a tertiary insolation level for each solar panel. For example, insolation estimator 210 could decrease the secondary insolation level for each solar panel based on meteorological data 204 that indicates the presence of cloud cover or atmospheric smoke over the geographic area at the given point in time. In this manner, insolation estimator 210 generator insolation data 214.

As a general matter, the calculations described above cannot be performed manually due to the inherent complexity associated with those calculations and the constraint that these calculations have to be performed on very short time scales in order to provide accurate and up-to-date results. Accordingly, these calculations can only be implemented using a computer, such as computing device 110 of FIG. 1.

Output predictor 220 is configured to process metrology data 222 in conjunction with installation data 204 and insolation data 214 to generate solar power generation data 224. Metrology data 222 includes electricity distribution measurements recorded by utility meters at various locations within the geographic area. For example, metrology data 222 could include electricity distribution measurements recorded by smart meters coupled to residences within the geographic area. The smart meters could be networked together to form a mesh network and be configured to periodically report portions of metrology data 222 to a centralized location via the mesh network.

Solar power generation data 234 indicates the amount of electricity that can be generated by solar panels at any given location within the geographic area at any given point in time. When generating solar power generation data 224, output predictor 220 processes installation data 204 to assign an estimated solar power generation capacity to each solar panel within the geographic area based on a corresponding time of installation of the solar panel. For example, output predictor 220 could assign to a solar panel that is installed in the year 2010 the average solar power generation capacity of solar panels built or deployed in the year 2010.

The solar power generation capacity for a given solar panel generally reflects the electrical output of the given solar panel across a range of insolation levels. Accordingly, output predictor 220 can compute the electrical output of a given solar panel within the geographic area at a given point in time based on the solar power generation capacity of the given solar panel and the level of insolation at the given solar panel at the given point in time. Further, output predictor 220 can repeat the above computation across all solar panels in the geographic area to determine or predict the total amount of solar power generated within the geographic area at the given point in time. Output predictor 220 computes the total amount of solar power generated within the geographic area across a range of times, including a range of future times, to populate solar power generation data 224.

In one embodiment, output predictor 220 may also determine, using metrology data 222, the storage capacity of any electricity storage systems associated with locations within the geographic area, including those where solar panels are installed and those where solar panels are not installed. For a given location within the geographic area, output predictor 220 first determines an amount of electricity that is distributed to the given location at a given point in time. If solar panels are installed at the given location, output predictor 220 also determines an amount of electricity that is generated via solar panels at the given location at the given point in time using the techniques described above. Based on one or both of these two amounts of electricity, output predictor 220 estimates the total amount of electricity that is available at the location at the given point in time (less any electricity that is distributed from the given location at the given point in time). Output predictor 220 then estimates the amount of electricity that is consumed at the given location at the given point in time based on one or more electricity consumption models. Output predictor 220 computes the difference between the amount of electricity that is available and the amount of electricity that is consumed at the given location at the given point in time to determine a remaining amount of electricity. That remaining amount of electricity is likely stored in an electricity storage system, such as a home battery. Via the above computations, output predictor 220 may compute the storage capacity of electricity storage systems across all locations within the geographic area.

Solar power generation data 224 can be used to make accurate forecasts regarding how much electricity needs to be distributed to the geographic area at any given point in time. In particular, the amount of solar power that is generated within the geographic area at a given point in time no longer needs to be distributed to the geographic area at that point in time and therefore no longer needs to be generated by an electricity provider. Accordingly, the above techniques can be implemented to generate precisely the amount of electricity that is needed within the geographic area, thereby helping to prevent situations where too little or too much electricity is generated. Further, the above techniques are sufficiently robust to provide accurate predictions even when irregular meteorological conditions prevail.

Infrastructure evaluator 230 is configured to process infrastructure data 232 in conjunction with solar power generation data 224 to generate infrastructure modifications 234. Infrastructure data 232 describes the electricity distribution infrastructure associated with the geographic area. Infrastructure data 232 indicates the various low voltage and high voltage transmission lines, transformers, feeders, substations, and other electricity distribution elements that reside within the geographic area. Infrastructure data 232 also describes the electricity distribution capabilities of those electricity distribution elements.

Infrastructure modifications 234 indicate one or more changes that can be made to the electricity distribution infrastructure in order to mitigate potential impediments to electricity distribution. A given impediment to electricity distribution, also referred to herein as a "distribution impediment," may include a portion of the electricity distribution infrastructure that distributes electricity inefficiently, such as a low voltage transmission line. A given distribution impediment may also include a portion of the electricity distribution infrastructure that is designed to distribute electricity in one direction but cannot easily distribute electricity in a reverse direction. Distribution impediments can be problematic in regions of the geographic area where surplus electricity is generated via solar power systems because distribution impediments interfere with the distribution of that surplus electricity. Infrastructure evaluator 230 generates infrastructure modifications 234 to mitigate distribution impediments.

When generating infrastructure modifications 234, infrastructure evaluator 230 processes solar power generation data 224 to identify any regions within the geographic area where surplus electricity can potentially be generated via solar panels. For example, infrastructure evaluator 230 could identify a region within the geographic area where more than a threshold percentage of structures have solar power systems. Alternatively, infrastructure evaluator 230 could evaluate solar power generation data 224 relative to an electricity consumption model to identify one or more regions that consume less electricity than is generated via solar panels.

Infrastructure evaluator 230 also analyzes infrastructure data 232 to determine how efficiently the electricity distribution infrastructure can distribute any surplus electricity. In doing so, infrastructure evaluator 230 identifies any distribution impediments that may interfere with the distribution of that surplus electricity. For example, infrastructure evaluator 230 could determine that a first region of the geographic area can generate surplus electricity via solar power systems but cannot distribute that surplus electricity to a second region of the geographic area without using inefficient low voltage transmission lines. Infrastructure evaluator 230 generates one or more infrastructure modifications 234 to address any such distribution impediments. Returning to the above example, infrastructure evaluator 230 could generate an infrastructure modification 234 indicating that high voltage transmission lines should be constructed connecting the first region to the second region, thereby mitigating the distribution impediment. Alternatively, infrastructure evaluator 230 could generate an infrastructure modification 234 indicating that an electricity storage system should be built within the first region to store surplus electricity, thereby obviating the need to distribute the electricity to the second region. With the approach described herein, infrastructure evaluator 230 can address situations where surplus electricity generated via solar power systems would otherwise be distributed inefficiently.

Once the various data elements of forecast data 122 are generated in the manner described above, interface generator 240 generates forecast interface 124 to facilitate various interactions with the user and to allow the user to query forecast data 122 and visualize results. In particular, interface generator 240 generates forecast interface 124 to visually depict the geographic area, and then receives user input 242 indicating a given region of the geographic area. Interface generator 240 accesses solar power generation data 224 and updates forecast interface 124 to visualize the amount of electricity that can be generated within the given region across a range of times. Interface generator 240 also accesses infrastructure modifications 234 and updates forecast interface 124 to visualize those infrastructure modifications. FIGS. 3-6 set forth exemplary screenshots of forecast interface 124.

Example Screenshots of Forecast Interface

Figure 3:
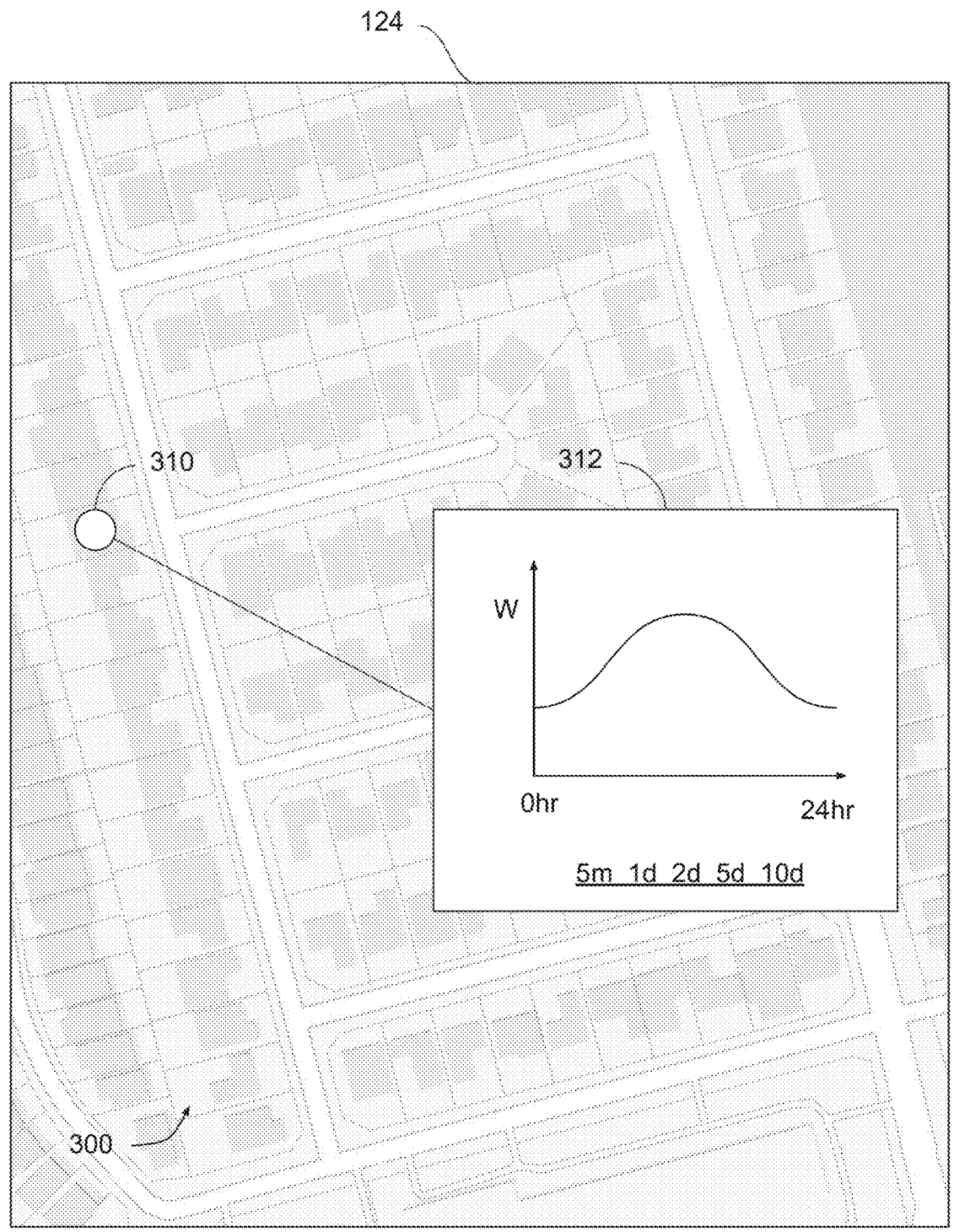
FIG. 3 illustrates how the forecast interface of FIG. 1 displays short-term solar power generation data for a location within a geographic area, according to various embodiments.

FIG. 3 illustrates how the forecast interface of FIG. 1 displays short-term solar power generation data for a location within a geographic area, according to various embodiments. As shown, forecast interface 124 depicts a geographic area 300. Geographic area 300 includes a plurality of residences where solar power systems may be installed. In exemplary operation, forecast interface 124 receives user input indicating a location 310 corresponding to a residence where a solar power system is installed. In response, interface generator 240 queries forecast data 122 to extract solar power generation data 224 associated with location 310. Interface generator 240 then generates forecast panel 312 based on the extracted data to indicate a 24-hour (hr) solar power generation forecast for location 310. Interface generator 240 can perform the above techniques for a given region within geographic area 300 as well, as described below in conjunction with FIG. 4.

Figure 4:
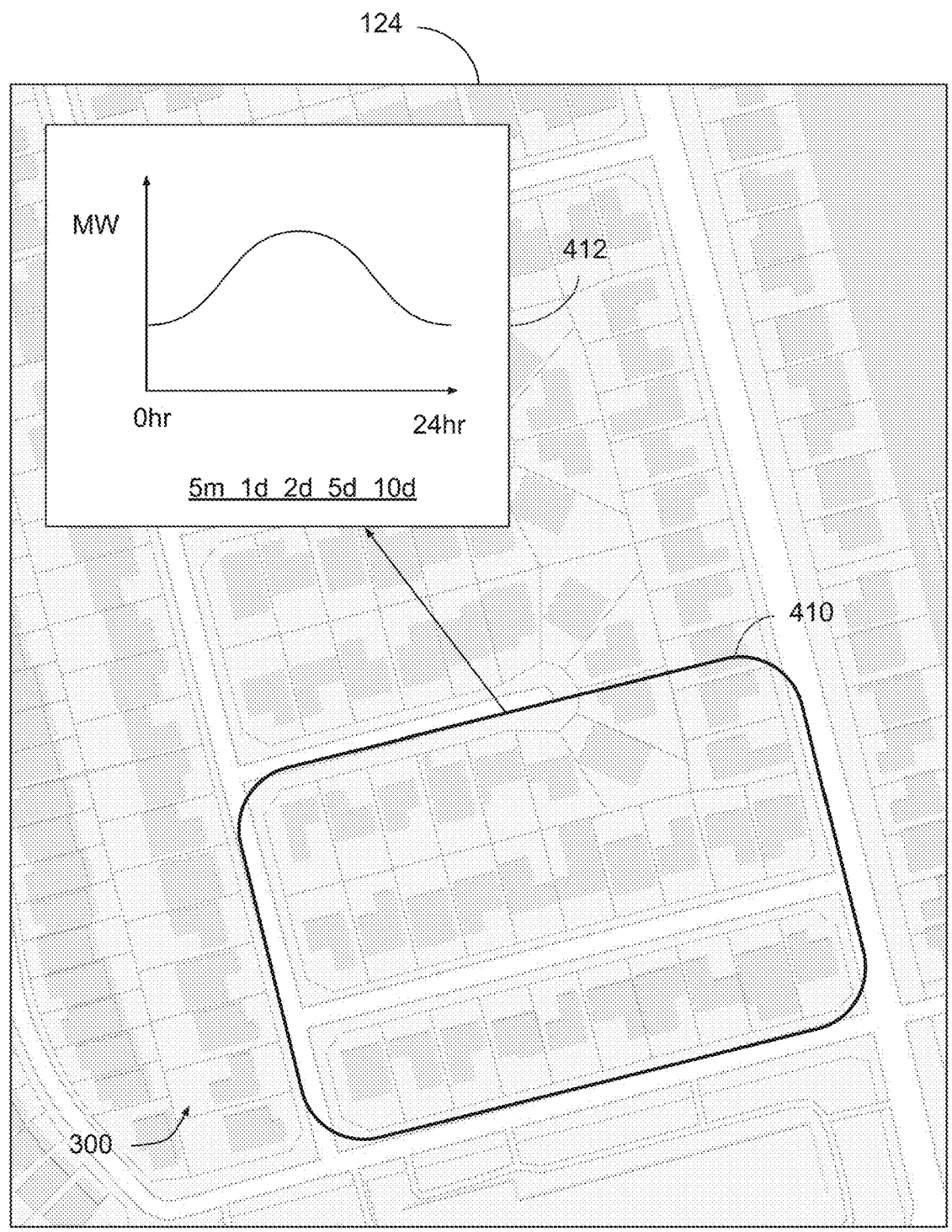
FIG. 4 illustrates how the forecast interface of FIG. 1 displays short-term solar power generation data for a region within a geographic area, according to various embodiments.

FIG. 4 illustrates how the forecast interface of FIG. 1 displays short-term solar power generation data for a region within a geographic area, according to various embodiments. As shown, forecast interface 124 depicts a region 410 of geographic area 300. In exemplary operation, forecast interface 124 receives user input indicating region 410 corresponding to a portion of a neighborhood where solar power systems may be installed. In response, interface generator 240 queries forecast data 122 to extract solar power generation data 224 associated with the various locations included in region 410. Interface generator 240 then generates forecast panel 412 based on the extracted data to indicate a 24-hr solar power generation forecast for region 410. Interface generator 240 can perform an additional technique to visualize a long-term solar power generation forecast, as described below in conjunction with FIG. 4.

Figure 5:
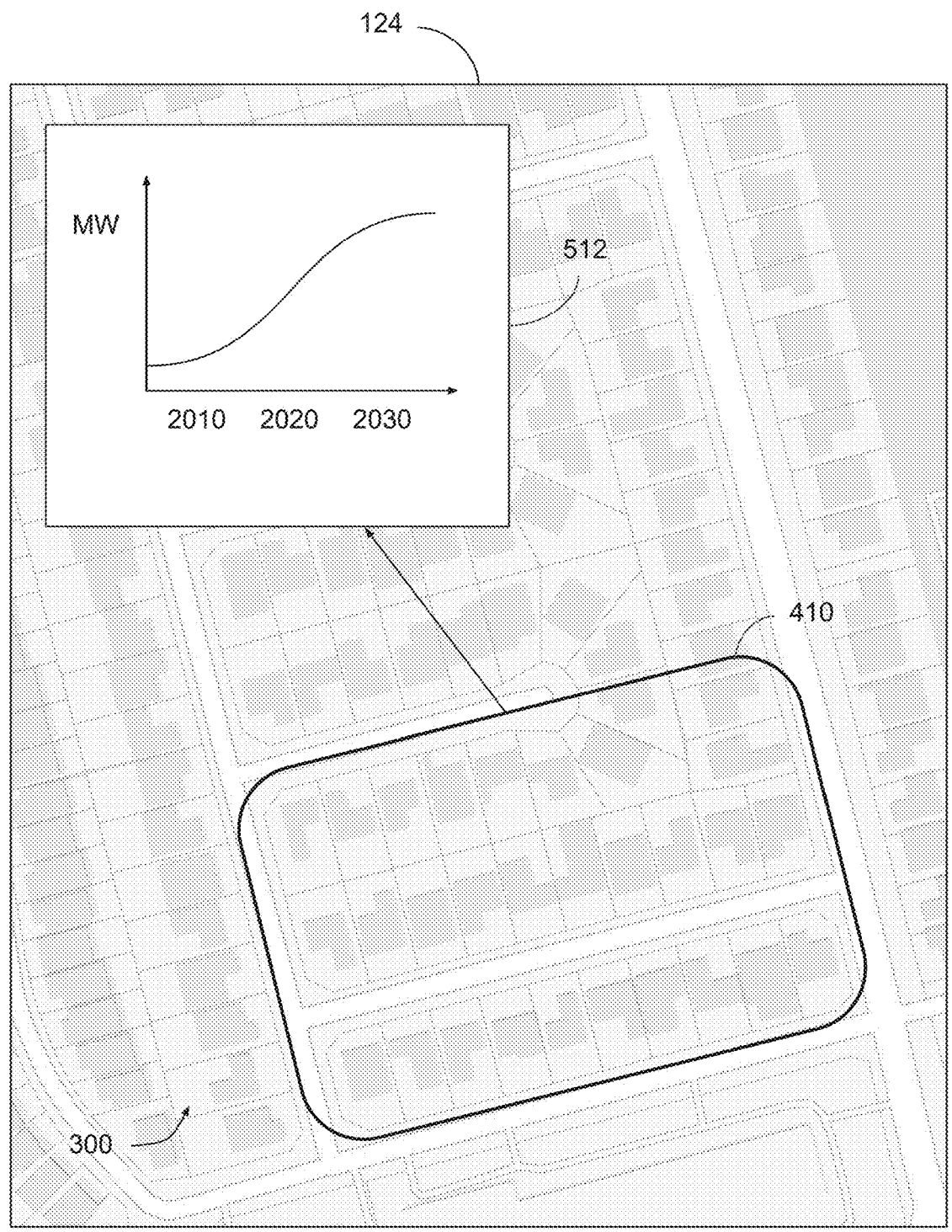
FIG. 5 illustrates how the forecast interface of FIG. 1 displays long-term solar power generation data for a region within a geographic area, according to various embodiments.

FIG. 5 illustrates how the forecast interface of FIG. 1 displays long-term solar power generation data for a region within a geographic area, according to various embodiments. As shown, forecast interface 124 depicts region 410 of geographic area 300, as also shown in FIG. 4. In exemplary operation, forecast interface 124 receives user input indicating that a long-term solar power generation forecast should be visualized via forecast interface 124. In response, interface generator 240 queries forecast data 122 to extract solar power generation data 224 associated with the various locations included in region 410 over an extended time frame. Interface generator 240 then generates forecast panel 512 based on the extracted data to indicate a multi-year solar power generation forecast for region 410. Interface generator 240 also performs a technique to visualize infrastructure modifications 234, as described below in conjunction with FIG. 5.

Figure 6:
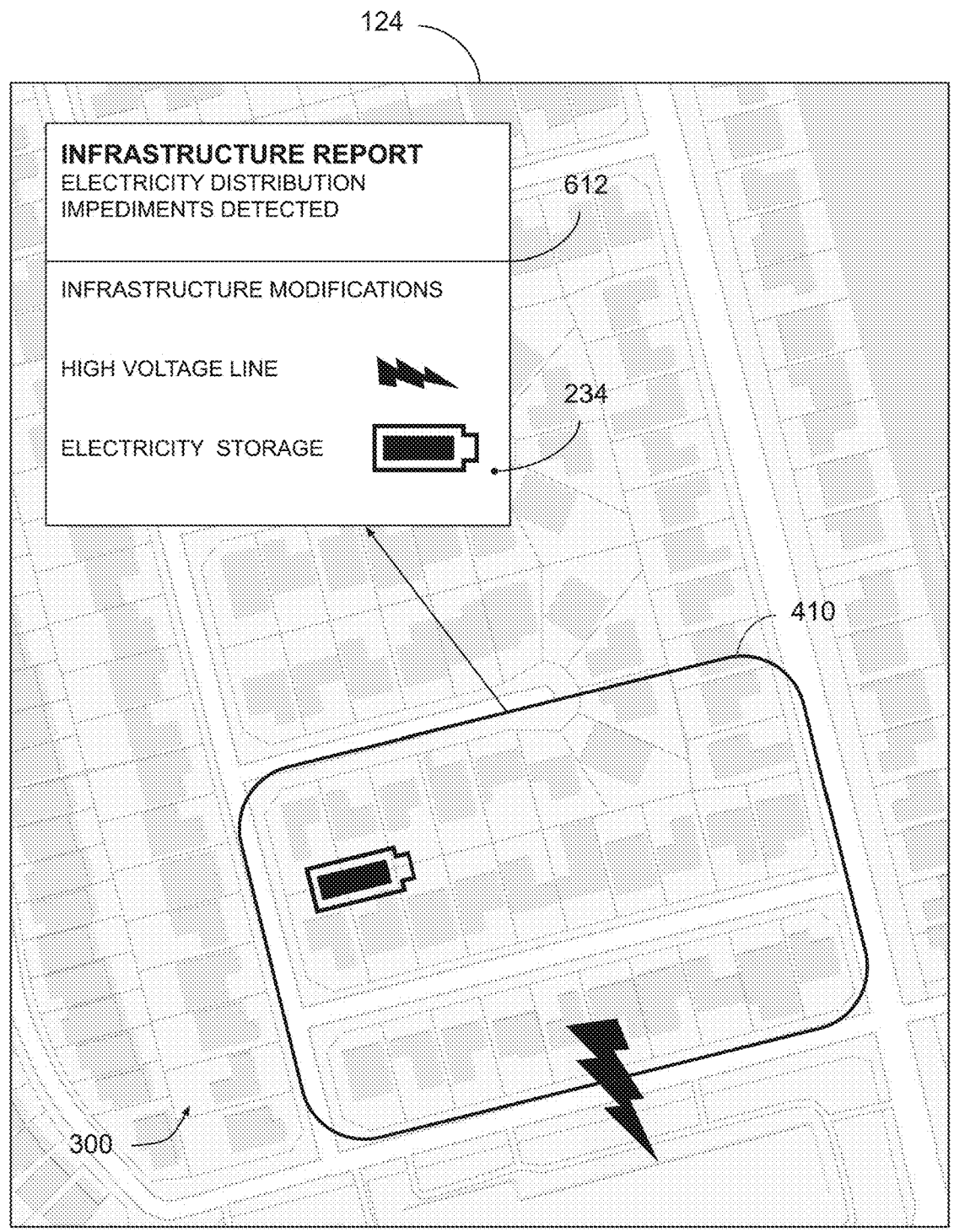
FIG. 6 illustrates how the forecast interface of FIG. 1 displays infrastructure modifications for a region within a geographic area, according to various embodiments.

FIG. 6 illustrates how the forecast interface of FIG. 1 displays infrastructure modifications for a region within a geographic area, according to various embodiments. As shown, forecast interface 124 depicts region 410 of geographic area 300, as also shown in FIGS. 4-5. In exemplary operation, forecast interface 124 receives user input indicating that infrastructure modifications 234 should be visualized via forecast interface 124. In response, interface generator 240 queries forecast data 122 to extract infrastructure modifications 234 associated with the various locations included in region 410. Interface generator 240 then generates infrastructure panel 612 based on the extracted data to indicate infrastructure modifications 234 that can potentially mitigate any impediments to the distribution of surplus electricity within region 410 that may occur during future intervals of time. In the example shown, forecast interface 124 indicates a location where a high voltage transmission line could be installed to facilitate higher efficiency distribution of surplus electricity. Forecast interface 124 also indicates a location where an electricity storage system could be installed to store surplus electricity, thereby obviating the need to distribute that surplus electricity outside of region 410.

Via the techniques described above, forecast engine 120 provides a comprehensive set of tools for generating and visualizing various types of data relevant in the field of solar power systems, in general, and behind-the-meter solar power forecasting, specifically. With these techniques, electricity providers can more effectively scale electricity generation to avoid situations where too little or too much electricity is generated. The techniques described above are described in greater detail below in conjunction with FIGS. 7-8.

Procedures for Quantifying and Visualizing Solar Power Generation Data

Figure 7:
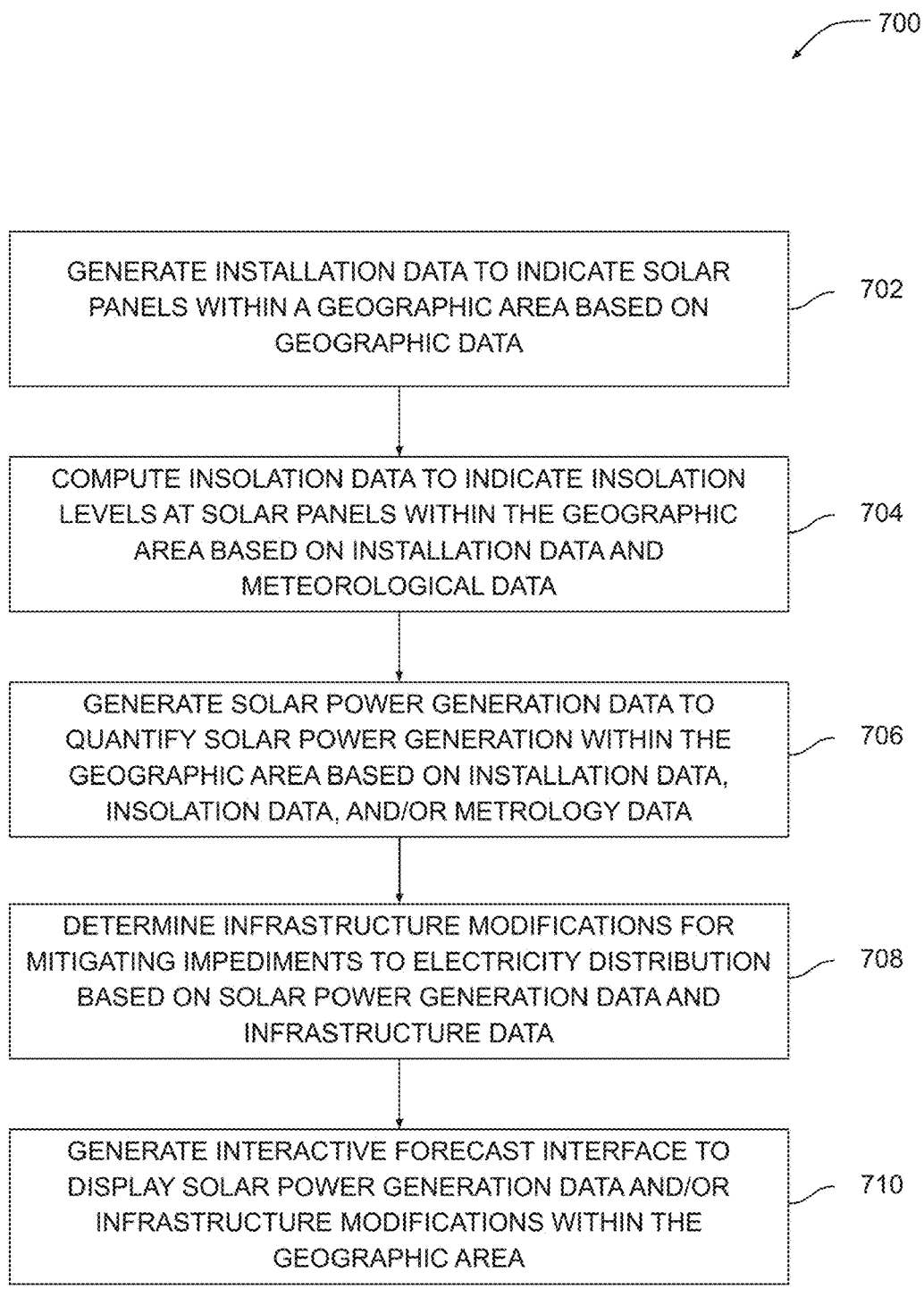
FIG. 7 is a flow diagram of method steps for predicting behind-the-meter solar power generation within a geographic area, according to various embodiments.

FIG. 7 is a flow diagram of method steps for quantifying behind-the-meter solar power generation within a geographic area, according to various embodiments. Although the method steps are described in conjunction with the systems of FIGS. 1-6, persons skilled in the art will understand that any system configured to perform the method steps in any order falls within the scope of the present embodiments.

As shown, a method 700 begins at step 702, where geographic analyzer 200 within forecast engine 120 generates installation data 204 to indicate solar panels within the geographic area based on geographic data 202. Geographic data 202 may include aerial images, satellite images, light detection and ranging data, drone reconnaissance data, and any other technically feasible type of data associated with the geographic area. Installation data 204 describes solar panels that reside in the geographic area. In performing step 702, geographic analyzer 200 processes geographic data 202 to identify the presence of solar panels within the geographic area and determines various attributes of those solar panels, including the location, dimensions, orientation, shading level, time of installation, and so forth.

At step 704, insolation estimator 210 within forecast engine 120 computes insolation data 214 to reflect insolation levels at solar panels within the geographic area based on installation data 204 and meteorological data 212. Meteorological data 212 includes data related to atmospheric and/or weather phenomena within the geographic area over different time frames. Meteorological data 212 also indicates how different meteorological phenomena can modify insolation levels within the geographic area. In performing step 704, insolation estimator 210 analyzes seasonal variations in solar position in conjunction with meteorological data 212 to determine or predict, for any given point in time, a level of insolation at each solar panel described in installation data 204.

At step 706, output predictor 220 within forecast engine 120 generates solar power generation data 224 to quantify solar power generation within the geographic area based on installation data 204, insolation data 214, and metrology data 222. Metrology data 222 includes electricity distribution measurements recorded by utility meters at various locations within the geographic area. Metrology data 222 can be used to quantify electricity consumption needs at various locations in the geographic area. Solar power generation data 234 indicates the amount of electricity that can be generated by solar panels at any given location within the geographic area at any given point in time. In performing step 706, output predictor 220 processes installation data 204 to assign an estimated solar power generation capacity to each solar panel within the geographic area based on a corresponding time of installation of the solar panel. Output predictor 220 computes the electrical output of each solar panel within the geographic area at a given point in time based on the solar power generation capacity of the solar panel and the level of insolation at the solar panel at the given point in time.

At step 708, infrastructure evaluator 230 within forecast engine 120 determines infrastructure modifications 234 for mitigating impediments to electricity distribution based on solar power generation data 224 and infrastructure data 232. Infrastructure data 232 describes the electricity distribution infrastructure associated with the geographic area. Infrastructure data 232 indicates the various low voltage and high voltage transmission lines, transformers, feeders, substations, and other electricity distribution elements that reside within the geographic area. Infrastructure modifications 234 indicate one or more changes that can be made to the electricity distribution infrastructure in order to mitigate potential impediments to electricity distribution (distribution impediments).

At step 710, interface generator 240 within forecast engine 120 generates forecast interface 124 to display solar power generation data and/or infrastructure modifications within the geographic area. Forecast interface 124 facilitates various interactions with the user and allows the user to query forecast data 122 and visualize results. In particular, interface generator 240 generates forecast interface 124 to visually depict the geographic area, and then receives user input 242 indicating a given region of the geographic area. Interface generator 240 then accesses solar power generation data 224 and updates forecast interface 124 to visualize the amount of electricity that can be generated via solar panels within the given region across a range of times. Interface generator 240 also accesses infrastructure modifications 234 and updates forecast interface 124 to visualize those infrastructure modifications. Various operations performed by interface generator 240 in conjunction with forecast interface 124 are described in greater detail below in conjunction with FIG. 8.

Forecast engine 120 implements the method 700 to make accurate forecasts regarding how much electricity needs to be distributed to the geographic area at any given point in time. In some cases, the amount of solar power that is generated within the geographic area at a given point in time no longer needs to be distributed to the geographic area at that point in time and therefore no longer needs to be generated. Accordingly, the above techniques can be implemented to generate precisely the amount of electricity that is needed within the geographic area, thereby helping to prevent situations where too little or too much electricity is generated. Further, the above techniques can be implemented to address situations where surplus electricity that is generated via solar power systems cannot be efficiently distributed.

Figure 8:
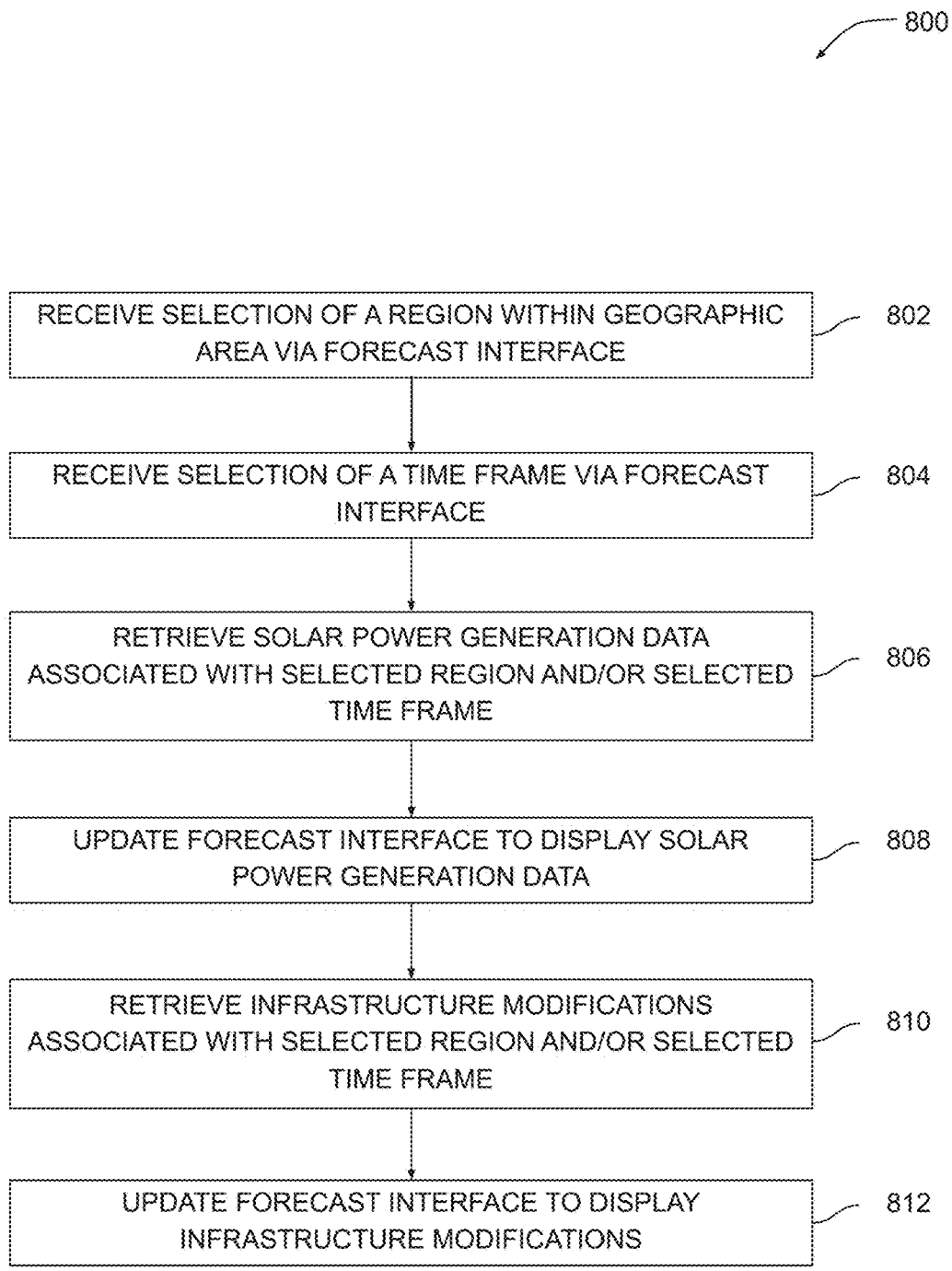
FIG. 8 is a flow diagram of method steps for generating behind-the-meter solar power generation within a geographic area for display, according to various embodiments.

FIG. 8 is a flow diagram of method steps for generating solar power generation data for display, according to various embodiments. Although the method steps are described in conjunction with the systems of FIGS. 1-6, persons skilled in the art will understand that any system configured to perform the method steps in any order falls within the scope of the present embodiments.

As shown, a method 800 begins at step 802, where interface generator 240 within forecast engine 120 receives a selection of a region of the geographic area via forecast interface 124. The region of the geographic area may include one or more locations where solar panels are installed. For example, the region of the geographic area could include a residential neighborhood, as shown in FIGS. 3-6.

At step 804, interface generator 240 receive a selection of a time frame via forecast interface 124. Forecast interface 124 may include a forecast panel that exposes various user interface controls to the user and allows the user to select different time frames. The different time frames may include past, present, or future time intervals.

At step 806, interface generator 240 retrieves solar power generation data 224 associated with the selected region and the selected time frame. In one embodiment, forecast data 122 may reside within a database that forecast engine 120 generates via the techniques described above in conjunction with FIG. 2. Interface generator 240 may be configured to query forecast data 122, based on the selected region and selected time frame, to extract relevant portions of solar power generation data 224.

At step 808, interface generator 240 updates forecast interface 124 to display solar power generation data corresponding to the selected region and selected time frame. In so doing, interface generator 240 updates the forecast panel mentioned above in conjunction with step 804. Interface generator 240 could, for example, update the forecast panel to depict a graph of electricity generation via solar power systems over the selected time frame.

At step 810, interface generator 240 retrieves infrastructure modifications 234 associated with the selected region and the selected time frame. Infrastructure modifications 234 are generated based on the determination that surplus electricity can be generated at certain times but cannot be efficiently distributed via existing electricity distribution infrastructure, as discussed above in conjunction with FIG. 2. A given infrastructure modification 234 could include, for example, high voltage power lines coupling two or more portions of electricity distribution infrastructure or one or more electricity storage systems configured to store surplus electricity rather than distribute the surplus electricity elsewhere.

At step 812, interface generator 240 updates forecast interface 124 to display infrastructure modifications 234. Infrastructure modifications 234 can mitigate impediments to electricity distribution by increasing electricity distribution capacity or by obviating the need to distribute surplus electricity.

In sum, a forecast engine is configured to analyze aerial and/or satellite images depicting a geographic area to identify the existence of solar panels within the geographic area at different times. Based on the installation time of each solar panel, the forecast engine estimates the solar power generation capacity of the solar panel. The forecast engine also analyzes meteorological data, including weather forecasts, to estimate a level of insolation at each solar panel within the geographic area across a range of times. The forecast engine can then determine the total amount of solar power generation within the given geographic area at a particular time using the solar power generation capacity of each solar panel and the level of insolation at each solar panel at the particular time.

The forecast engine performs the above operations to generate solar power generation forecasts for the geographic area across a range of time frames and for specific locations and/or regions within the geographic area. The forecast engine can also analyze infrastructure data associated with the geographic area to identify various impediments to electricity distribution that may interfere with the efficient distribution of electricity. For a given impediment to electricity distribution, the forecast engine determines one or more infrastructure modifications that may mitigate the given impediment and potentially facilitate more efficient distribution of electricity. The forecast engine also generates a forecast interface that allows a user to interactively select specific locations and/or regions of the geographic area and obtain solar power generation forecasts for those specific locations and/or regions.

At least one technical advantage of the disclosed techniques relative to the prior art is that the disclosed techniques enable more accurate predictions of solar power generation to be made for geographic areas where the distribution of solar power systems us unknown and irregular environmental factors cause the amount of solar power that can be generated over given periods of time to vary unpredictably. Accordingly, electricity providers can more effectively predict the amount of electricity that needs to be generated and distributed to consumers who use their own solar power systems.

1. Some embodiments include a computer-implemented method for forecasting solar power generation levels, comprising determining a set of solar panels within a geographic area based on at least one image that depicts the geographic area at a first point in time, computing a plurality of insolation levels associated with the set of solar panels based on geographic data associated with the geographic area, wherein each insolation level indicates an amount of solar irradiance present at a different solar panel included in the set of solar panels at a second point in time, and generating solar power generation data for the geographic area based on the plurality of insolation levels, wherein the solar power generation data indicates an amount of electricity generated within the geographic area via the set of solar panels at the second point in time.

2. The computer-implemented method of clause 1, wherein the at least one image comprises an aerial image or a satellite image depicting the geographic area at the first point in time.

3. The computer-implemented method of any of clauses 1-2, wherein determining the set of solar panels comprises determining different portions of the at least one image that correspond to different solar panels, and determining a location for each different solar panel within the geographic area.

4. The computer-implemented method of any of clauses 1-3, wherein computing the plurality of insolation levels associated with the set of solar panels comprises determining, for each solar panel included in the set of solar panels, an installation time associated with the solar panel based on the geographic data, determining, for each solar panel included in the set of solar panels, an electricity generation capacity of the solar panel based on the installation time associated with the solar panel, and computing, for each solar panel included in the set of solar panels, an insolation level for the solar panel at the second point in time based on the electricity generation capacity of the solar panel.

5. The computer-implemented method of any of clauses 1-4, wherein computing the plurality of insolation levels associated with the set of solar panels comprises determining, for each solar panel included in the set of solar panels, an angle of incidence between the solar panel and a light source based on the geographic data at the second point in time, and computing, for each solar panel included in the set of solar panels, an insolation level of the solar panel at the second point in time based on the angle of incidence.

6. The computer-implemented method of any of clauses 1-5, wherein generating the solar power generation data for the geographic area comprises determining, for each solar panel included in the set of solar panels, an electricity generation capacity of the solar panel based on the geographic data, and determining, for each solar panel included in the set of solar panels, a solar power generation level for the solar panel at the second point in time based on the electricity generation capacity of the solar panel and the insolation level of the solar panel at the second point in time.

7. The computer-implemented method of any of clauses 1-6, further comprising generating a user interface that depicts the geographic area based on the geographic data, receiving a selection of a first region of the geographic area via the user interface, receiving a selection of the first point in time via the user interface, and modifying the user interface to depict a portion of the solar power generation data associated with the first region of the geographic area and the first point in time.

8. The computer-implemented method of any of clauses 1-7, further comprising determining an amount of surplus electricity available at the second point in time based on the solar power generation data, identifying at least one distribution impediment that interferes with distributing the amount of surplus electricity based on infrastructure data associated with the geographic area, and generating one or more infrastructure modifications that mitigate the at least one distribution impediment.

9. The computer-implemented method of any of clauses 1-8, wherein the one or more infrastructure modifications indicate that one or more energy storage modules should be added to an electricity distribution infrastructure within the geographic area.

10. The computer-implemented method of any of clauses 1-9, wherein the one or more infrastructure modifications indicate that one or more high voltage power lines should be added to couple a first electricity distribution infrastructure associated with a first region of the geographic area to a second electricity distribution infrastructure associated with a second region of the geographic area.

11. Some embodiments include a non-transitory computer-readable medium storing program instructions that, when executed by a processor, causes the processor to forecast solar power generation levels by performing the steps of determining a set of solar panels within a geographic area based on at least one image that depicts the geographic area at a first point in time, computing a plurality of insolation levels associated with the set of solar panels based on geographic data associated with the geographic area, wherein each insolation level indicates an amount of solar irradiance present at a different solar panel included in the set of solar panels at a second point in time, and generating solar power generation data for the geographic area based on the plurality of insolation levels, wherein the solar power generation data indicates an amount of electricity generated within the geographic area via the set of solar panels at the second point in time.

12. The non-transitory computer-readable medium of clause 11, wherein the step of determining the set of solar panels comprises determining, via a machine learning algorithm, different groups of pixels within the at least one image that correspond to different solar panels, and determining, via the machine learning algorithm, a location for each different solar panel within the geographic area based on a corresponding group of pixels, wherein the at least one image comprises a satellite image, wherein the machine learning algorithm is trained based on training data that depicts a set of solar panels.

13. The non-transitory computer-readable medium of any of clauses 11-12, wherein the step of computing the plurality of insolation levels associated with the set of solar panels comprises determining, for each solar panel included in the set of solar panels, an installation time associated with the solar panel based on the geographic data, determining, for each solar panel included in the set of solar panels, an electricity generation capacity of the solar panel based on the installation time associated with the solar panel, and computing, for each solar panel included in the set of solar panels, an insolation level for the solar panel at the second point in time based on the electricity generation capacity of the solar panel.

14. The non-transitory computer-readable medium of any of clauses 11-13, wherein the step of computing the plurality of insolation levels associated with the set of solar panels comprises determining, for each solar panel included in the set of solar panels, an angle of incidence between the solar panel and a light source based on the geographic data at the second point in time, and computing, for each solar panel included in the set of solar panels, an insolation level of the solar panel at the second point in time based on the angle of incidence.

15. The non-transitory computer-readable medium of any of clauses 11-14, wherein the step of generating the solar power generation data for the geographic area comprises determining, for each solar panel included in the set of solar panels, an electricity generation capacity of the solar panel based on the geographic data, and determining, for each solar panel included in the set of solar panels, a solar power generation level for the solar panel at the second point in time based on the electricity generation capacity of the solar panel and the insolation level of the solar panel at the second point in time.

16. The non-transitory computer-readable medium of any of clauses 11-15, further comprising the steps of generating a user interface that depicts the geographic area based on the geographic data, receiving a selection of a first location within the geographic area via the user interface, receiving a selection of the first point in time via the user interface, and modifying the user interface to depict a portion of the solar power generation data associated with the first location at the first point in time.

17. The non-transitory computer-readable medium of any of clauses 11-16, further comprising determining an amount of surplus electricity available at the second point in time based on the solar power generation data, identifying at least one distribution impediment that interferes with distributing the amount of surplus electricity based on infrastructure data associated with the geographic area, and generating one or more infrastructure modifications that mitigate the at least one distribution impediment.

18. The non-transitory computer-readable medium of any of clauses 11-17, wherein the one or more infrastructure modifications indicate that one or more energy storage modules should be added to an electricity distribution infrastructure within the geographic area and that one or more high voltage power lines should be added to couple a first electricity distribution infrastructure associated with a first region of the geographic area to a second electricity distribution infrastructure associated with a second region of the geographic area.

19. The non-transitory computer-readable medium of any of clauses 11-18, further comprising generating a user interface that depicts the geographic area based on the geographic data, and modifying the user interface to depict the one or more infrastructure modifications.

20. Some embodiments include a system, comprising a memory storing a software application, and a processor that, when executing the software application, is configured to perform the steps of determining a set of solar panels within a geographic area based on at least one image that depicts the geographic area at a first point in time, computing a plurality of insolation levels associated with the set of solar panels based on geographic data associated with the geographic area, wherein each insolation level indicates an amount of solar irradiance present at a different solar panel included in the set of solar panels at a second point in time, and generating solar power generation data for the geographic area based on the plurality of insolation levels, wherein the solar power generation data indicates an amount of electricity generated within the geographic area via the set of solar panels at the second point in time.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
processing, via a machine learning algorithm executing on a computing device, different groups of pixels within at least one image that depicts a geographic area at a first point in time to determine different respective locations for individual solar panels included in a plurality of solar panels of a solar power installation within the geographic area;
determining, by the computing device, respective angles of incidence between individual solar panels included in the plurality of solar panels and a light source at a second point in time based on the different respective locations for the individual solar panels;
computing, by the computing device, respective insolation levels for individual solar panels included in the plurality of solar panels at the second point in time based on the respective angles of incidence; and
generating, by the computing device, solar power generation data for the geographic area based on the respective insolation levels, wherein the solar power generation data indicates an amount of electricity generated within the geographic area via the plurality of solar panels at the second point in time.

2. The method of claim 1, wherein the at least one image comprises an aerial image or a satellite image depicting the geographic area at the first point in time.

3. The method of claim 1, wherein processing the different groups of pixels within the at least one image comprises:
identifying different portions of the at least one image that correspond to different solar panels; and
determining the different respective locations for the plurality of solar panels within the geographic area.

4. The method of claim 1, wherein computing the respective insolation levels comprises:
determining respective installation times for the plurality of solar panels based on geographic data associated with the geographic area;
determining respective electricity generation capacities for the plurality of solar panels based on the respective installation times; and
computing respective insolation levels for the plurality of solar panels at the second point in time further based on the respective electricity generation capacities of the plurality of solar panels.

5. The method of claim 1, wherein generating the solar power generation data for the geographic area comprises:
determining respective electricity generation capacities for the plurality of solar panels based on the geographic data associated with the geographic area; and
determining respective solar power generation levels for the plurality of solar panels at the second point in time based on the respective electricity generation capacities and the respective insolation levels at the second point in time.

6. The method of claim 1, further comprising:
generating, by the computing device, a user interface that depicts the geographic area based on geographic data associated with the geographic area;
receiving, by the computing device, a selection of a first region of the geographic area via the user interface;
receiving, by the computing device, a selection of the first point in time via the user interface; and modifying, by the computing device, the user interface to depict a portion of the solar power generation data associated with the first region of the geographic area and the first point in time.

7. The method of claim 1, further comprising:
determining, by the computing device, an amount of surplus electricity available at the second point in time based on the solar power generation data;
identifying, by the computing device, at least one distribution impediment that interferes with distributing the amount of surplus electricity based on infrastructure data associated with the geographic area; and
generating, by the computing device, one or more infrastructure modifications that mitigate the at least one distribution impediment.

8. The method of claim 7, wherein the one or more infrastructure modifications indicate that one or more energy storage modules should be added to an electricity distribution infrastructure within the geographic area.

9. The method of claim 7, wherein the one or more infrastructure modifications indicate that one or more high voltage power lines should be added to couple a first electricity distribution infrastructure associated with a first region of the geographic area to a second electricity distribution infrastructure associated with a second region of the geographic area.

10. A non-transitory computer-readable medium storing program instructions that, when executed by a processor, causes the processor to perform the steps of:
processing, via a machine learning algorithm executing on a computing device, different groups of pixels within at least one image that depicts a geographic area at a first point in time to determine different respective locations for individual solar panels included in a plurality of solar panels of a solar power installation within the geographic area;
determining respective angles of incidence between individual solar panels included in the plurality of solar panels and a light source at a second point in time based on the different respective locations for the individual solar panels;
computing respective insolation levels for individual solar panels included in the plurality of solar panels at the second point in time based on the respective angles of incidence; and
generating solar power generation data for the geographic area based on the respective insolation levels, wherein the solar power generation data indicates an amount of electricity generated within the geographic area via the plurality of solar panels at the second point in time.

11. The non-transitory computer-readable medium of claim 10, wherein the at least one image comprises a satellite image, and wherein the machine learning algorithm is trained based on training data that depicts a set of solar panels.

12. The non-transitory computer-readable medium of claim 10, wherein the step of computing the respective insolation levels comprises:
determining respective installation times for the plurality of solar panels based on geographic data associated with the geographic area;
determining respective electricity generation capacities for the plurality of solar panels based on the respective installation times; and
computing respective insolation levels for the plurality of solar panels at the second point in time further based on the respective electricity generation capacities of the solar panels.

13. The non-transitory computer-readable medium of claim 10, wherein the step of generating the solar power generation data for the geographic area comprises:
determining respective electricity generation capacities for the plurality of solar panels based on geographic data associated with the geographic area; and
determining respective solar power generation levels for the plurality of solar panels at the second point in time based on the respective electricity generation capacities and the respective insolation levels at the second point in time.

14. The non-transitory computer-readable medium of claim 10, further comprising the steps of:
generating a user interface that depicts the geographic area based on geographic data associated with the geographic area;
receiving a selection of a first location within the geographic area via the user interface;
receiving a selection of the first point in time via the user interface; and
modifying the user interface to depict a portion of the solar power generation data associated with the first location at the first point in time.

15. The non-transitory computer-readable medium of claim 10, further comprising:
determining an amount of surplus electricity available at the second point in time based on the solar power generation data;
identifying at least one distribution impediment that interferes with distributing the amount of surplus electricity based on infrastructure data associated with the geographic area; and
generating one or more infrastructure modifications that mitigate the at least one distribution impediment.

16. The non-transitory computer-readable medium of claim 15, wherein the one or more infrastructure modifications indicate that one or more energy storage modules should be added to an electricity distribution infrastructure within the geographic area and that one or more high voltage power lines should be added to couple a first electricity distribution infrastructure associated with a first region of the geographic area to a second electricity distribution infrastructure associated with a second region of the geographic area.

17. The non-transitory computer-readable medium of claim 16, further comprising:
generating a user interface that depicts the geographic area based on geographic data associated with the geographic area; and
modifying the user interface to depict the one or more infrastructure modifications.

18. A system, comprising:
a memory storing a software application; and
a processor that, when executing the software application, is configured to perform the steps of:
processing, via a machine learning algorithm, different groups of pixels within at least one image that depicts a geographic area at a first point in time to determine different respective locations for individual solar panels included in a plurality of solar panels of a solar power installation within the geographic area, determining respective angles of incidence between individual solar panels included in the plurality of solar panels and a light source at a second point in time based on the different respective locations for the individual solar panels, computing respective insolation levels for individual solar panels included in the plurality of solar panels at the second point in time based on the respective angles of incidence, and generating solar power generation data for the geographic area based on the respective insolation levels, wherein the solar power generation data indicates an amount of electricity generated within the geographic area via the plurality of solar panels at the second point in time.

* * * * *

UNITED STATES PATENT AND TRADEMARK OFFICE
CERTIFICATE OF CORRECTION

Page 1 of 1

PATENT NO. : 11,728,767 B2
APPLICATION NO. : 16/696873
DATED : August 15, 2023
INVENTOR(S) : Brian Glaister It is certified that error appears in the above-identified patent and that said Letters Patent is hereby corrected as shown below:

In the Claims

Column 18, Claim 5, Line 53, please delete "the" after on.

Signed and Sealed this
Third Day of October, 2023

Katherine Kelly Vidal
*Director of the United States Patent and Trademark Office*